United States Patent [19]

Bracht

[11] Patent Number: 4,680,594
[45] Date of Patent: Jul. 14, 1987

[54] SINGLE BEAM DIRECT READ DURING WRITE AND WRITE PROTECT SYSTEM FOR USE IN AN OPTICAL DATA STORAGE SYSTEM

[75] Inventor: Roger R. Bracht, Colorado Springs, Colo.

[73] Assignee: Optotech, Inc., Colorado Springs, Colo.

[21] Appl. No.: 847,274

[22] Filed: Apr. 2, 1986

[51] Int. Cl.⁴ .......................... G01D 9/42; G11B 5/09
[52] U.S. Cl. ...................................... 346/108; 369/45; 369/54
[58] Field of Search ................. 346/108, 107 R, 76 L; 369/54, 14, 47, 30, 44, 45, 275; 360/77

[56] References Cited
U.S. PATENT DOCUMENTS 4,363,116 12/1982 Kleuters et al. ....................... 369/30
4,587,579 5/1986 Cocke .................................... 369/14

Primary Examiner—Clifford C. Shaw
Assistant Examiner—Mark Reinhart
Attorney, Agent, or Firm—Kinney & Lange

[57] ABSTRACT

A single beam direct read during write and write protect system for use in an optical data storage system. The optical data storage system includes a reflective-type optical disk, a laser for producing a beam of radiation to write data onto the optical disk during write operations, and a radiation detector for producing write detect signals representative of radiation detected from the optical disk during the write operations. A slope detector produces verification signals indicative of the accuracy of the write operations as a function of a slope of the peaks of the write detect signals. A digital counter is enabled by the verification signals, and produces a write error signal when a predetermined number of inaccurate write operations are detected.

11 Claims, 4 Drawing Figures

SINGLE BEAM DIRECT READ DURING WRITE AND WRITE PROTECT SYSTEM FOR USE IN AN OPTICAL DATA STORAGE SYSTEM

BACKGROUND OF THE INVENTION

1. Field of the Invention

The present invention relates to optical data storage systems. In particular, the present invention is a single beam direct read during write system for use in an optical data storage system.

2. Description of the Prior Art

Optical data storage systems are becoming an increasingly popular form for storing digital information. Data storage systems of this type include an optical record carrier for storing information in digital form, and an optical head for writing data to and reading data from the optical disk. During write operations, a laser within the optical head produces a beam of radiation having a write intensity level. The beam of radiation is directed to the optical disk, and produces optically detectable changes in the reflectivity of the optical disk at individual bit positions. During read operations, a laser beam having a lower read intensity level is produced by the optical head and directed to the optical disk. A detector within the optical head produces detector signals representative of a magnitude of the radiation reflected from individual bit positions on the optical disk. The detector signals are representative of data previously written to, and stored on, the optical disk.

In optical data storage sytems of this type it is always necessary to verify the accuracy of write operations, that is, to determine whether or not data was properly written to individual bit positions of the optical disk. Errors can, for example, occur when write operations are performed on bit positions which are defective due to variables in the processes used to manufacture the optical disk. Two general verification techniques for performing this function are known within the art.

In the first prior art technique, individual bit positions are read after they have been written. The data storage system can thereby determine whether or not the information actually written to the optical disk corresponds to that which was desired to be written. This technique can be implemented with a single beam optical head which produces only one beam of radiation, or a multiple beam optical head. when implemented with the single beam optical head, the written data must be read on a second pass or revolution of the optical disk. Time is thereby wasted, detracting from overall system performance. Although a multiple beam optical head produces a second beam of radiation which can be used to read the data after is has been written by a first beam, the optics required to produce the second beam adds to the cost and complexity of the optical head.

The second prior art verification technique is known as direct read after write (DRAW), and can be implemented with a single beam optical head. Characteristics of the write detect signals are monitored immediately after the beam of radiation is turned off. These characteristics have only a small margin, as they are very short in duration. Relatively complicated circuitry is therefore needed to accurately detect these characteristics of write detect signals.

It is evident that there is a continuing need for improved verification systems and techniques for monitoring the accuracy of write operations in optical data storage systems. A system which can be implemented with a single beam optical head, and which permits the accuracy of write operations to be determined during the write operations, would be especially desirable. This system must be extremely accurate. The verificatio system should be capable of implementation with a relatively simple detector circuit so that it can be economically incorporated into optical data storage systems. To this end, the verification system must monitor characteristics of the write detect signals which have a relatively large margin. A verification system which can be easily adopted to both increasing and decreasing reflectivity-type optical disks is also desirable.

SUMMARY OF THE INVENTION

The present invention is a direct read during write (DRDW) apparatus for use in an optical data storage system. This data storage system includes a reflective-type optical disk and laser means for producing a beam of radiation to write data onto the optical disk during write operations. Radiation detector means produce signals representative of radiation reflected from the optical disk, including write detect signals representative of radiation detected during the write operations. Slope detector means responsive to the radiation detector means produce verification signals indicative of the accuracy of the write operations as a function of slope of the write detect signals.

The DRDW apparatus produces an accurate indication of the accuracy of write operations, and can be implemented with a single laser beam. Since the slopes of the write detect signals have a relatively large margin, the DRDW apparatus can be easily and inexpensively implemented. Furthermore, the DRDW apparatus works equally well with both increasing and decreasing reflectivity-type optical disks.

In preferred embodiments, the slope detector means includes write detect delay means responsive to the radiation detector means for delaying the write detect signals by a predetermined delay period, and for producing delayed write detect signals. Hysteresis comparator means compare the write detect signals to the delayed write detect signals and produce the verification signals as a function of comparison. Other embodiments include digital counter means responsive to the hysteresis comparator for counting the verifications signals and producing a write error signal when a predetermined number of inaccurate write operations are detected.

DETAILED DESCRIPTION OF THE PREFERRED EMBODIMENTS

Figure 1:
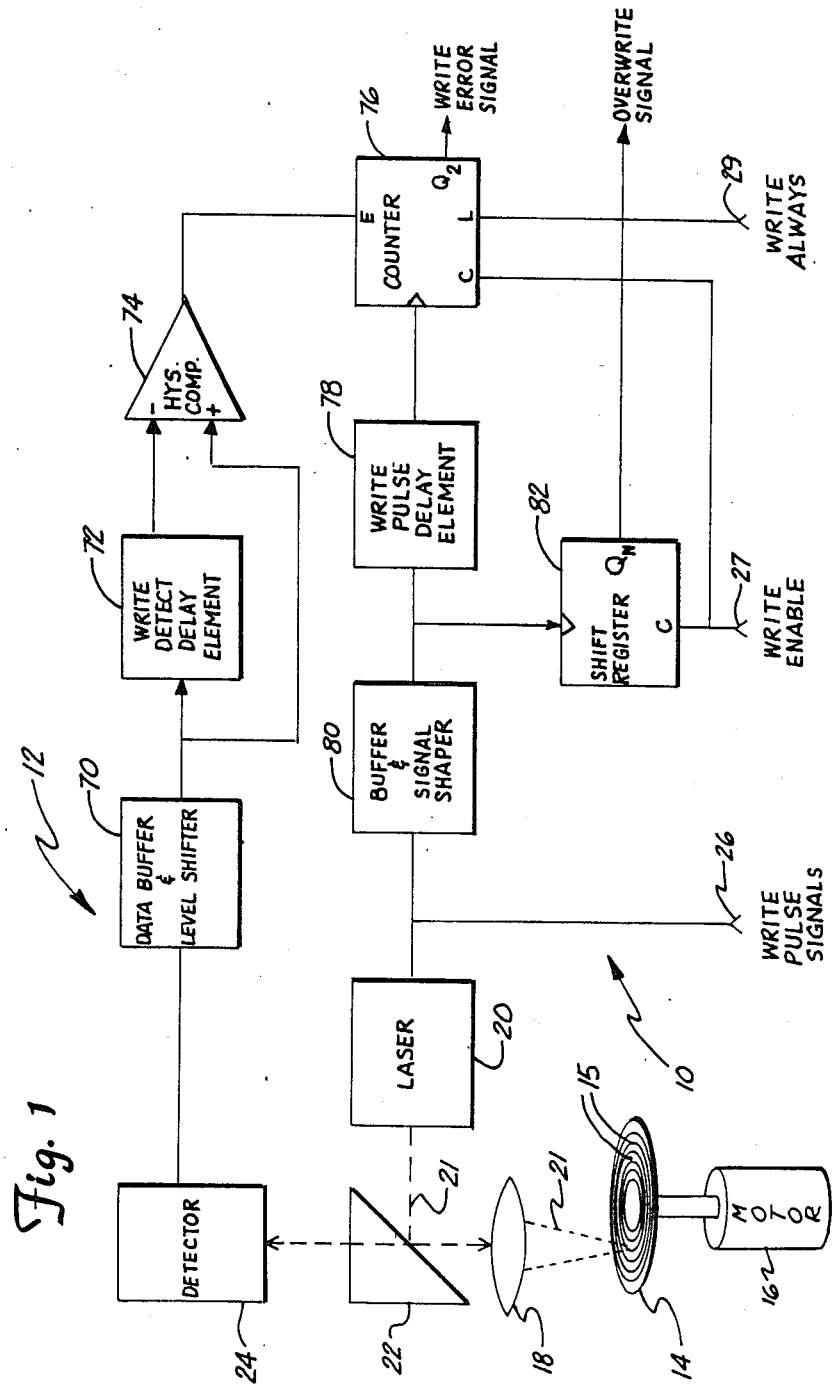
FIG. 1 is a block diagram representation of an optical data storage system which includes the single beam direct read during write (DRDW) and write protect system of the present invention.

An optical data storage system 12 which includes a preferred embodiment of single beam direct read during write and write protect (DRDW) apparatus 10 of the present invention is illustrated generally in FIG. 1. As shown in FIG. 1, optical data storage system 12 includes an optical record carrier or disk 14, motor 16, objective lens 18, a source of radiation such as laser 20, optics system 22, and radiation detector 24. Motor 16 rotates optical disk 14 about a rotational axis, thereby producing relative motion between optical disk 14 and objective lens 18. Objective lens 18, laser 20, optics system 22, and detector 24 are preferably components of a commercially available optical head assembly such as that manufactured by the Olympus Optical Company and identified by Model Numbers TAOHS-LC3 and LC4. The operation of optical heads of this type is well known.

Laser 20 is connected to receive write pulse signals from write control terminal 26. In response to the write pulse signals, laser 20 will produce a beam of radiation 21 (at a write intensity level) which is directed to objective lens 18 by optics system 22. Objective lens 18 focuses radiation beam 21 onto optical disk 14, thereby causing optically detectable changes at individual bit positions (not separately shown) on servo tracks 15 of optical disk 14. The writing of a single bit of information in response to a write pulse signal as described above is referred to as a write operation in remaining portions of this specification.

Radiation produced by laser 20 and impinged upon optical disk 14 during write operations is also relfected from optical disk 14, collected by opbjective lens 18, and directed to optics system 22. Optics system 22 then causes the reflected radiation to be impinged upon optical detector 24, which produces an electric signal representative of this reflected radiation. The signals produced by detector 24 during write operations are referred to as as write detect signals in remaining portions of this specification.

As indicated by the above description, optical disk 14 is a reflective-type disk in that individual bits of data are stored thereon as a function of the reflectivity of optical disk 14 at individual bit positions. Data storage system 12 typically causes data to be written to sectors (not separately shown) which are groups of a predetermined number of bit positions. Optical disks such as 14 are well known and commercially available. They also come in several different forms. One type of optical disk 14 has a first or relatively high reflectivity surface at all bit positions in its normal or unwritten state. During write operations, beam 21 burns a hole through, or destroys, the reflective layer of the disk at individual bit positions, and exposes a layer having a second or relatively low reflectivity. In alternate forms of disk 14, beam 21 exposes a layer which produces a phase cancellation. Written bit locations therefore have a relatively low reflectivity, while unwritten bit positions have a relatively high reflectivity. This type of medium is known as a "decreasing reflectivity" optical disk 14.

Another type of optical disk 14 is known as an "incresing reflectivity" disk. In its normal or unwritten state, this type of optical disk 14 has a surface with a first or relatively low reflectivity at all bit positions. During write operations, beam of radiation 21 burns a hole through, or destroys, the low reflectivity surface at individual bit positions, and exposes a layer having a second or relatively high reflectivity. In other forms of increasing reflectivity optical disks 14, beam 21 destroys a layer which produces a phase cancellation. Written bit positions therefore have a relatively high reflectivity, and unwritten bit locations a relatively low reflectivity, on the increasing reflectivity type optical disk 14. The present invention can work equally well with either type of optical disk 14.

The present invention is based on an understanding that the hole formation at bit positions during write operations is not instantaneous with either type of optical disk 14. Hole formation phenomenon or characteristics for both increasing and decreasing reflectivity-type optical disks 14 are shown in relation to write pulse signals which initiate their production in FIG. 2. As shown, the write pulse signals used to control laser 20 are digital signals switching between first, (e.g., logic 0) and second, (e.g., logic 1) states. Int he embodiment shown, write operations are performed by applying a logic 1 write pulse signal to laser 20 for a predetermined time period such as 70 ns. Due to various system delays including propagation delays within optics system 22 and the rise time of laser 20, write detect signals are not produced by detector 24 until approximately 20 ns after the application of a write pulse signal to laser 20.

Figure 2:
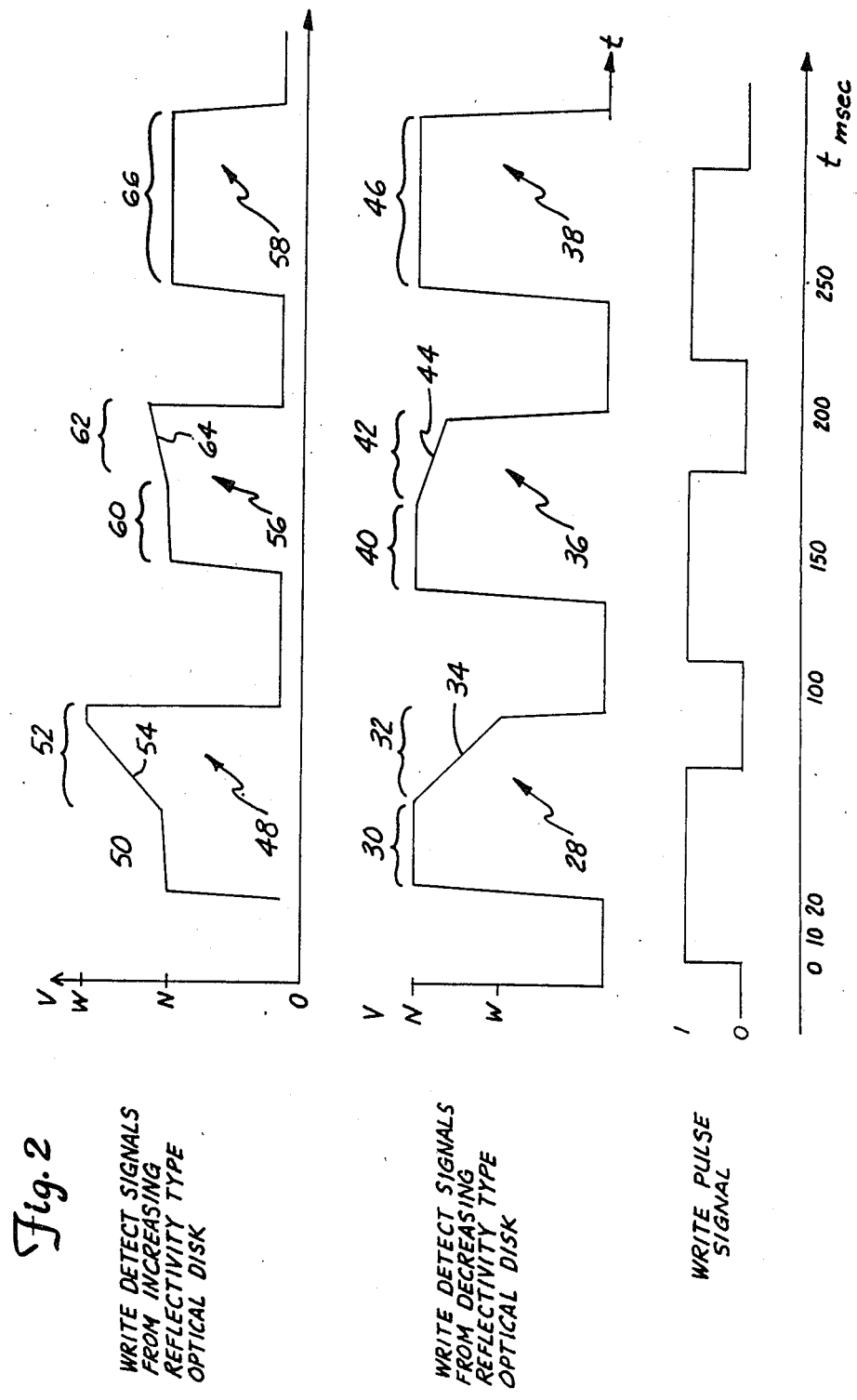
FIG. 2 is a graphic illustration of write detect signals produced by the detector shown in FIG. 1 in response to write pulse signals applied to the laser, for both increasing and decreasing reflectivity-type optical disks.

Characteristics of a write detect signal received during an accurate, or good, write operation on a decreasing reflectivity-type optical disk 14 are illustrated generally in FIG. 2 by reference numeral 28. As shown, the magnitude of the write detect signal will rise quickly from zero to a value N representative of the reflectivity of the optical disk in its normal or unwritten state. The holes do not form immediately upon application of radiation beam 21 to a bit position to be written. Rather, reflectivity of optical disk 14 will remain at its unwritten value N for a time period 30 while radiation beam 21 heats the reflective surface. After time period 30, or during period 32, the hole slowly forms, or opens, with the lower reflectivity surface being gradually exposed. As a result, reflectivity of optical disk 14, as represented by write detect signal 28 gradually decreases from its normal value N to its written value W. Write detect signal 28 therefore has a sloping portion 34 at its peak which characterizes an accurate write operation. Sloping portion 34 will have a slope of at least a predetermined magnitude if the write operation was accurate and a written bit position is properly formed.

Characteristics of write detect signals produced by detector 24 during inaccurate or bad write operations are illustrated by reference numerals 36 and 38. After the application of a write pulse signal to laser 20, write detect signal 36 again rises from a zero value to a value N representing the reflectivity of optical disk 14 in its normal state. The magnitude of the write detect signal remains at the normal value N for time period 40 before any hole formation occurs. During time period 42, the hole on optical disk 14 begins to form and the reflectivity of the bit position decreases as illustrated by sloping portion 44 at a peak of write detect signal 36. The hole at the bit position on optical disk 14 is, however, only partially formed by the termination or end of the write operation. As a result, the magnitude of the write detect signal has decreased only slightly from its normal value N, and has not decreased to the written value W. The magnitude of the slope of sloping portion 44 is therefore much less than it would be had the write operation been an accurate one.

Write detect signal 38 represents an even worse case. The magnitude of write detect signal 38 remained at the normal value N throughout the write operation (period 46). As a result, a peak of write detect signal 38 has no slope, and is therefore indicative of an inaccurate write operation.

Write detect signal 48 illustrates characteristics indicative of a good, or accurate, write operation on an increasing reflectivity optical disk 14. Reflectivity of the optical disk, as represented by the magnitude of the write detect signal 48, increases rapidly from zero to a value N indicative of the normal reflectivity of the optical disk 14 after appliction of a write pulse signal. After time period 50, the hole on the optical disk 14 begins to form, or open, and the reflectivity gradually increases during time period 52 to a written value W representative of an accurately written bit position. Write detect signal 48 therefore has a sloping portion 54 at its peak. Sloping portion 54 will have a slope of at least a predetermined magnitude if the write operation was accurate.

Write detect signals 56 and 58 have characteristics of bad or inaccurate write operations on an increasing reflectivity-type optical disk 14. Write detect signal 56 has a magnitude representative of the normal reflectivity N of optical disk 14 for a period 60 after the application of a write pulse signal to laser 20. During time period 62, a hole begins to form, and the magnitude of a peak of write detect signal 56 increases only slightly. Since the hole was not completely formed by the termination of the write pulse signal, the magnitude of write detect signal 56 never reaches a value W indicative of the reflectivity of an accurately formed hole. A magnitude of the slope of sloping portion 64 is therefore less than it would be had the write operation been accurate.

Write detect signal 58 has a peak which remains at the normal reflectivity value N throughout time period 66. Since there was no hole formation, the peak of write detect signal 58 has no slope.

DRDW Apparatus 10 of the present invention utilizes the above described characteristics of write detect signals to determine the accurace of write operations while the write operations are taking place, In particular, DRDW 10 monitors the slope of the peaks of the write detect signals and determines the accuracy of the write operations as a function of this slope. This writing and monitoring process can therefore be performed with a single beam of radiation 21.

Referring back to FIG. 1, DRDW apparatus 10 is shown to include data buffer and level shifter 70, write detect delay element 72, hysteresis comparator 74, counter 76, write pulse delay element 78, buffer and signal shaper 80, and shift register 82. Data buffer and level shifter 70 is connected to receive write detect signals from detector 24. Write detect signals produced by detector 24 typically have a small DC offset. Data buffer and level shifter 70 eliminates this offset, and references all write detect signals to a common level, such as zero volts. Data buffer and level shifter 70 also matches impedance characteristics of detector 24 to write detect delay element 72.

Write detect delay element 72 and hysteresis comparator 74 function together as a slope detector and produce verification signals as a function of the slope of the peaks of write detect signals received from data buffer and level shifter 70. The verification signals are therefore representative of the accuracy of individual write operations. Operation of DRDW apparatus 10 is best described with reference to FIG. 3.

Write detect delay element 72 delays the buffered write detect signals produced by data buffer and level shifter 70 by a predetermined delay period, and applies delayed write detect signals D to a first or negative terminal of hysteresis comparator 74. In one embodiment, write detect delay element 72 delays original write detect signals O by 30 nsec. The buffered write detector signals produced by data buffer and level shifter 70, i.e., original write detect signals O, are applied to a second or positive terminal of hysteresis comparator 74. Hysteresis comparator 74 produces verification signals representative of the accuracy of each individual write operation as a function of the slope of the write detect signals. This function is carried out by hysteresis comparator 74 by comparing the delayed write detect signals D to the original write detect signals O, and producing the verification signals only if the magnitude of the difference between the two signals is greater than the hysteresis value of the detector, and thereby indicative of adequate slope. The verification signals are then applied to an enable (E) input of counter 76.

Figure 3:
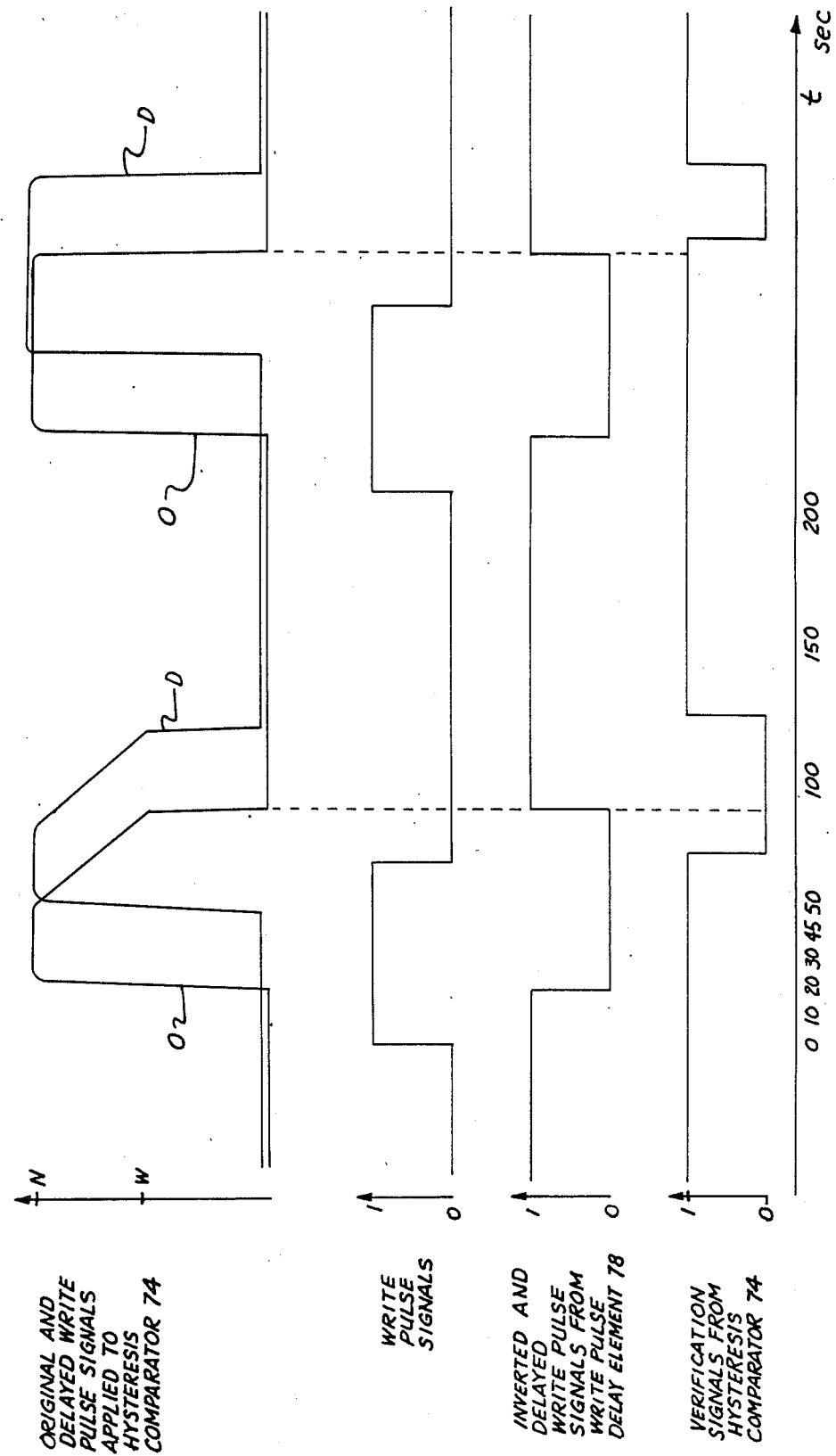
FIG. 3 is a graphic illustration of signals applied to the hysteresis comparator, verification signals produced by the hysteresis comparator, and the delayed write pulse signals applied to the counter, as a function in time of the write pulse signals applied to the laser.

Buffer and signal shaper 80 is connected to receive the write pulse signals applied to write pulse terminal 26, and matches impedance characteristics of write pulse terminal 26 to write pulse delay element 78. Buffer and signal shaper 80 also converts the write pulse signals back into a digital form in a well known manner. Write pulse delay element 78 is connected to receive the write pulse signals from buffer and signal shaper 80, inverts the write pulse signals, and delays the write pulse signals by a predetermined value which compensates for the system delays previously discussed between initiation of a write operation by the write pulse signals, and the receipt of write detect signals by detector 24. In one embodiment, as illustrated in FIG. 3, write pulse delay element 78 delays the write pulse signals by 20 nsec. The inverted and delayed write pulse signals are then applied to the clock input terminal by counter 76.

Counter 76 is clocked by positive (i.e., 0-to-1) transitions of the delayed write pulse signals, and thereby counts verification signals representative of inaccurate write operations. As illustrated in FIG. 3, the verification signals produced by hysteresis comparator 74 will have switched from a logic 1 to a logic 0 state before the positive transitions of delayed write pulse signals if accurate write operations are detected, thereby enabling counter 76. On the other hand, the verification signals will still have a logic 1 state, thereby disabling counter 76, when an inaccurate write operation is detected. When a predetermined number of inaccurate write operations are detected by hysteresis comparator 74 and counted by counter 76, counter 76 produces a write error signal. In the embodiment shown, counter 76 will produce the write error signal when four inaccurate write operations have been detected and counted.

Counter 76 also has a clear (C) terminal connected to receive write enable signals from write enable terminal 27, and a load (L) terminal connected to receive write always signals from write always terminal 29. Write enable signals clear or reset counter 76, while write always signals inhibit the production of write error signals. In one embodiment, data storage system 10 causes write enable signals to be applied to counter 76 at a beginning of each sector to which data is written. In this embodiment, a write error signal will be produced when four inaccurate write operations to any sector are detected.

In one embodiment of optical data storage system 12, optical disk 14 includes a plurality of servo tracks 15 onto which information is written. Each servo track 15 is divided into a plurality of sectors (not separately shown), with each sector containing a predetermined number of bit positions. In one commonly used data encoding format, a beginning of each sector is identified by a predetermined pattern of written bit positions. When write pulses signals cause laser 20 to initiate a write operation on a previously written bit position, detector 24 will produce write detect signals indicative of inaccurate write operations such as those shown in FIG. 2. These characteristics are used by DRDW apparatus 10 to determine if previously written sectors are being accidentally overwritten.

Shift register 82 has a clock input terminal connected to receive the buffered write pulse signals from buffer and signal shaper 80. After a predetermined number of write pulse signals equal to the predetermined number of bit positions identifying the beginning of a sector have been applied to shift register 82, an overwrite signal is produced. Additional circuitry (not shown) monitors both the write error signal and the overwrite signal. If a write error signal is produced before the overwrite signal is produced, there is a high probability that a previously written sector on optical disk 14 is being overwritten. As shown in FIG. 3, shift register 82 also has a clear (C) terminal connected to receive the write enable signals. When it is desired to overwrite a previously written sector, a write always signal is applied to counter 76 to inhibit production of the write error signal.

Figure 4:
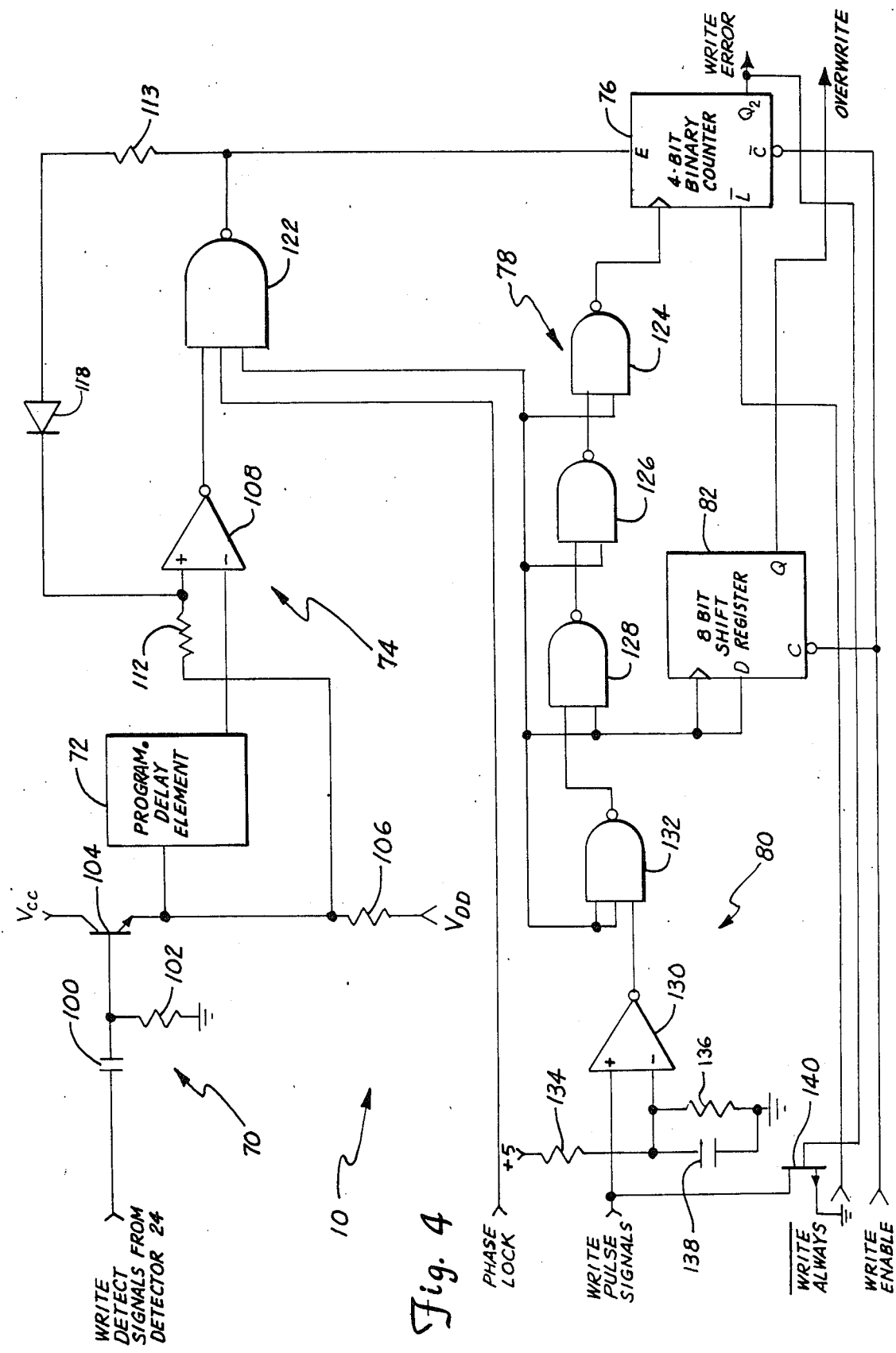
FIG. 4 is a detailed schematic diagram of the DRDW and write protect system illustrated in FIG. 1.

FIG. 4 is a detailed schematic diagram illustrating one preferred embodiment of the DRDW apparatus 10 shown in FIG. 1. Data buffer and level shifter 70 is connected to receive write detect signals from detector 24, and includes capacitor 100, resistor 102, transistor 104, and resistor 106. Write detect element 72 is preferably a programmable delay element. Delay elements of this type are commercially available.

Hysteresis comparator 74 includes comparator 108, resistors 112 and 113, diode 118, and NAND gate 122. A phase lock signal representative of synchronization of a data recovery clock (not shown) to data being read from optical disk 14 is applied to one terminal of NAND gate 122. Should phase lock be lost, the verification signals produced at the output of NAND gate 122 will indicate an error as if an inaccurate write operation was detected. In this preferred embodiment, hysteresis comparator 74 will produce verification signals indicative of inaccurate write operations unless the slope of the write detect signals are such that a difference between the original (O) and delayed (D) write detect signals is greater than approximately 120 millivolts.

Counter 76 is a four-bit counter in the embodiment shown in FIG. 4. Right pulse delay element 78 is formed by three NAND gates 124, 126 and 128. In the embodiment shown, shift register 82 is an eight-bit shift register.

Buffer and signal shaper 80 is preferably formed by comparator 130, NAND gate 132, resistors 134 and 136, and capacitor 138. Also included in the embodiment shown is an FET 140 which has a gate connected to receive the write error signal produced by a binary counter 76. FET 140 ensures that the wrikte pulse signals are latched low to inhibit burther writing of data until other circuit elements within optical data storage system 12 can detect the presence of a write error.

Although the present invention has been described with reference to preferred embodiments, workers skilled in the art will recognize that changes may be made in form and detail without departing from the spirit and scope of the invention.

What is claimed is:

1. Direct read during write apparatus for use in an optical data storage system, including:
   an optical disk;
   laser means for producing a beam of radiation to write data onto the optical disk during write operations;
   radiation detector means for producing signals representative of radiation received from the optical disk, wherein the signals include write detect signals representative of radiation detected during write operations; and
   slope detector means responsive to the radiation detector means for producing verification signals indicative of the accuracy of write operations as a function of a slope of the write detect signals.

2. The direct read during write apparatus of claim 1 wherein the slope detector means produces the verification signals as a function of the slope associated with peaks of the write detect signals.

3. The direct read during write apparatus of claim 1 wherein the slope detector means includes:
   write detect delay means responsive to the radiation detector means for delaying the write detect signals by a delay period and producing delayed write detect signals; and
   hysteresis comparator means for producing the verification signals as a function of the comparison of the write detect signals to the delayed write detect signals.

4. The direct read during write apparatus of claim 3 and further including write error means responsive to the hysteresis comparator means for counting verification signals and producing a write error signal after a predetermined number of verification signals representative of inaccurate write operations are counted.

5. The direct read during write apparatus of claim 4 wherein:
   the laser means is responsive to write pulse signals and produces the beam of radiation in response to the write pulse signals; and
   the write error means includes counter means having an enable input terminal connected to receive the verification signals and a clock input terminal connected to receive the write pulse signals, wherein the counter means counts a number of verification signals representative of inaccurate write operations, and produces write errror signals when a predetermined number of inaccurate write operations are counted.

6. The direct read during write apparatus of claim 5 wherein the counter means produces the write error signal after at least four inaccurate write operations are counted.

7. The direct read during write apparatus of claim 5 wherein the counter means has a load input terminal responsive to write always signals, and wherein the write always signals inhibit production of the write error signals by the counter means.

8. The direct read during write apparatus of claim 5 wherein the counter means has a clear input terminal responsive to write enable signals, and wherein the write enable signals cause the counter means to clear any write error signals previously produced.

9. The direct read during write apparatus of claim 5 and further including overwrite means for producing an overwrite signal indicating that write operations are being perfomed on previously written bit positions on the optical disk.

10. The direct read during write apparatus of claim 9 wherein the overwrite means comprises counter means connected to receive the write pulse signals for producing the overwrite signal when a predetermined number of write pulse signals are counted.

11. The direct read during write apparatus of claim 1 wherein the optical disk is a reflective-type optical disk.

* * * * *